United States Patent Office  3,842,142
Patented Oct. 15, 1974

3,842,142
UNSATURATED POLYESTER COMPOSITIONS
Michael A. Harpold, St. Albans, and Kenneth E. Atkins, South Charleston, W. Va., assignors to Union Carbide Corporation, New York, N.Y.
No Drawing. Filed July 20, 1972, Ser. No. 273,547
Int. Cl. C08f 43/08
U.S. Cl. 260—862                                11 Claims

ABSTRACT OF THE DISCLOSURE

The disclosure of this application is directed to unsaturated polyester compositions, containing a thermoplastic copolymer of vinyl chloride and vinyl acetate having a combined vinyl chloride content of about 35 to about 45 percent by weight, which remain homogeneous or in one-phase for extended periods of time and can be used in molding applications to form thermoset, shaped articles having excellent surface smoothness and excellent resistivity to the absorption of moisture.

---

This invention relates to unsaturated polyester compositions. More particularly, this invention relates to unsaturated polyester compositions containing, as a low-profile additive, a thermoplastic copolymer of vinyl chloride and vinyl acetate having a combined vinyl chloride content of about 35 to about 45 percent by weight, which remain homogeneous or in one-phase for extended periods of time and can be used in molding applications to form thermoset, shaped articles having excellent surface smoothness and excellent resistivity to the absorption of moisture. Shaped articles, produced from the compositions of this invention, are readily paintable and being resistant to the absorption of moisture are not subject to early "paint blistering," that is, loss of adhesion between the paint and the substrate due to the absorption of moisture.

Compositions, based on unsaturated polyesters, are finding increased use in many industries, for example, the automotive industry, as compositions from which can be molded fenders, dashboards and other like component parts of automobiles. As a general rule, these compositions contain, in addition to the unsaturated polyesters, a so-called low-profile additives such as poly(vinyl acetate). A low-profile additive is a material designed to insure that there is no undesirable shrinkage by the composition to which the additive has been added, as the composition is being molded into a thermoset article. In other words, low-profile additives have been added to unsaturated polyester compositions for the purpose of obtaining compositions which can be molded into thermoset articles, the surfaces of which truly reflect the surface characteristics of the mold.

Although unsaturated polyester compositions, containing a low-profile additive as described, are characterized by improved anti-shrinkage characteristics, it has been found that no currently available unsaturated polyester composition is characterized by a balance of properties, including homogeniety for extended periods of time, and when molded into thermoset articles of desired shape, by excellent surface smoothness and excellent resistivity to the absorption of moisture.

The present invention provides unsaturated polyester compositions, containing a thermoplastic copolymer of vinyl chloride and vinyl acetate having a combined vinyl chloride content of about 35 to about 45 percent by weight, which remain homogeneous for extended periods of time and can be molded into shaped articles characterized by excellent surface smoothness and resistivity to the absorption of moisture. The homogeneous or one-phase nature of the compositions of this invention allows them to be used directly by the ultimate user without the necessity of additional porcessing or stirring. The ultimate user, with a high degree of certainty that the unsaturated polyester compositions are homogeneous, can pump these compositions directly from a storage vessel into a compounding vessel wherein various standard additives, such as fillers, pigments, catalysts and the like can be added thereto to form the final molding compositions. The molding compositions can then be pumped directly to a mold and formed into thermoset articles of desired shape.

In addition, articles molded from the compositions of this invention, having excellent surface characteristics, require no extensive hand sanding operations in order to obtain smooth surfaces thereon. Also such articles, being resistant to the absorption of moisture (absorb not more than about 1.0 percent water when subjected to the water immersion test described subsequently in this specification), have excellent paint adhesion. As a result, the compositions of this invention can be used to form exterior parts of automobiles which can be painted to a long-lasting, high gloss finish.

As stated, the vinyl chloride-vinyl acetate copolymers, which serve as low-profile additives and are used in the formulation of the unsaturated polyester compositions of this invention, contain about 35 to about 45 percent by weight combined vinyl chloride. These copolymers are thermoplastic, generally have an inherent viscosity (ASTMD 1243–58T) of about 0.05 to about 0.50 and are present in the compositions in an amount of about 10 to about 85 percent and preferably about 20 to about 75 percent by weight based on the weight of the unsaturated polyester.

The unsaturated polyesters of this invention are the condensation reaction products of a mixture containing: an unsaturated polycarboxylic acid or anhydride thereof, an aromatic, polycarboxylic acid or anhydride thereof and a glycol having the formula:

Formula I

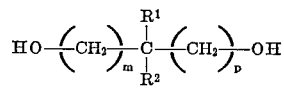

wherein the sum of $m + p$ is at least 1, preferably 1 to 20 inclusive and $R^1$ and $R^2$, which can be the same or different, are hydrogen or alkyl and when alkyl, containing 1 to 20 carbon atoms inclusive, preferably 1 to 10 carbon atoms inclusive.

The amount of aromatic, polycarboxylic acid or anhydride thereof in the reaction mixture is about 5 percent to about 30 percent by weight based on the combined weight of the unsaturated, polycarboxylic acid and the aromatic, polycarboxylic acid.

The glycol is present in the reaction mixture in at least about stoichiometric amounts, preferably about 2 to about 15 percent in excess of the stoichiometric amount, based on the total "acidic" content of the mixture which includes acids and acid anhydrides.

It is to be understood that mixtures of acids and anhydrides can be used, if so desired, in producing the unsaturated polyesters of this invention.

The unsaturated polyesters generally have an acid number less than about 100, generally below about 75 and preferably about 10 to about 70.

Specific glycols, falling within the scope of Formula I and used to produce the unsaturated polyesters include, among others, ethylene glycol, propylene glycol, butanediol-1,2, butanediol-1,3, butanediol-1,4, hexanediol-1,6, decanediol-1,10, neopentyl glycol and the like.

Also, ether diols can be used in producing the polyesters of this invention provided the amount in the condensation reaction mixture is less than about 25 percent by weight of the total diol content.

Suitable ether diols have the formula:

Formula II

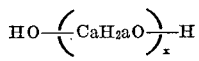

wherein $a$ has a value of at least 1, preferably 2 to 6 inclusive, and $x$ has a value of at least 2, preferably 2 to 10 inclusive. Among compounds falling within the scope of this formula are diethylene glycol, dipropylene glycol, triethylene glycol, tetraethylene glycol and the like.

When making stoichiometric determinations relative to the "acidic" reactants in the condensation reaction mixture, the total "diol" content, i.e. glycol and ether diols, is taken into account.

Illustrative of suitable unsaturated, polycarboxylic acids are those having the formula:

Formula III

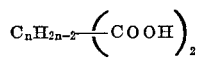

wherein $n$ is an integer having a value of 2 to 20 inclusive, preferably 2 to 10 inclusive. Among such acids can be noted, fumaric acid, maleic acid, glutaconic acid, citraconic acid, itaconic acid, ethidenemalonic acid, mesaconic acid, allylmalonic acid, propylidenemalonic acid, hydromuconic acid, pyrocinchonic acid, allyl succinic acid, carbocaprolactonic acid, teraconic acid, xeronic acids, cetylmalonic acid and other like ethylenically unsaturated acids.

Other suitable unsaturated acids include 4-amyl-2,5-heptadienedioic acid, 3-hexynedioic acid, tetrahydrophthalic acid, 3-carboxy cinnamic acid and the like.

As stated previously, the acid anhydrides of the acids noted above can be used per se or in admixture with the acids to produce the unsaturated polyesters of this invention.

In addition to the anhydrides of the acids noted above, the following acid anhydrides can also be used: pentyl succinic anhydride, octenyl succinic anhydride, nonenyl succinic anhydride, chloromaleic anhydride, dichloromaleic anhydride, hexachloroendomethylene tetrahydrophthalic anhydride, commonly referred to as chlorendic anhydride, the Diels-Alder adducts of maleic acid and alicyclic compounds having conjugated double bonds such as bicyclo[2,2,1]-hept-5-ene-2,3-dicarboxylic anhydride and the like.

Among aromatic polycarboxylic acids, can be noted: phthalic acid, isophthalic acid, terephthalic acid, alkyl substituted derivatives of these phthalic acids, halogen substituted derivatives of these phthalic acids, hemi-mellitic acid, trimellitic acid and the like.

In addition, small amounts of saturated polycarboxylic acids and/or anhydrides thereof and/or monocarboxylic acids can be used in the production of the unsaturated polyesters.

Illustrative of saturated polycarboxylic acids are: succinic acid, adipic acid, suberic acid, azelaic acid, sebacic acid, dimethyl succinic acid and the like as well as derivatives thereof, e.g., chlorinated derivatives.

Among suitable monocarboxylic acids, which usually contain a maximum of twenty-two carbon atoms, are benzoic acid, hexanoic acid, caprylic acid, lauric acid, caproic acid, myristic acid, palmitic acid, stearic acid, arachidic acid, palmitoleic acid, oleic acid, linoleic acid, linolenic acid, eleostearic acid, licanic acid, ricinoleic acid, hexenoic acid, hexadieneoic acid, octenoic acid, and the like. It is advantageous for purposes of economy to employ mixtures of acids, particularly those derived from natural sources such as castor oil, dehydrated castor oil, coconut oil, cottonseed oil, linseed oil, oiticica oil, perilla oil, olive oil, safflower oil, sardine oil, soybean oil, tall oil, tung oil (China wood oil), and the like.

Preparation of unsaturated polyesters can be carried out by methods well known in the art. As a rule the condensation reaction is conducted by reacting a mixture, as described, at temperatures on the order of about 160° C. to about 250° C., preferably about 175° C. to about 225° C., to polyesters having an acid number of less than about 100, generally below about 75 and preferably about 10 to about 70.

In formulating the compositions of this invention which are to be used in molding applications such as premix and preform, it is customary to admix, with the unsaturated polyesters and the vinyl chloride-vinyl acetate copolymer, the following materials:

1. A polymerizable, ethylenically unsaturated monomer which serves to cross-link the unsaturated polyester to a thermoset product.
2. A peroxide which serves to accelerate the crosslinking reaction.
3. Fillers, including fillers which serve as reinforcing agents.

Illustrative of suitable polymerizable, ethylenically unsaturated monomers are the vinyl monomers having the formula:

Formula IV

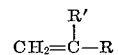

wherein R' is hydrogen, halogen, or alkyl, i.e., methyl, and R is a group having an unsaturated carbon-to-carbon, carbon-to-oxygen, or carbon-to-nitrogen group in conjugation with the vinyl group. Groups having such unsaturation in conjugation with the vinyl group are aryl, ketonic, heterocyclic, nitrile, carbalkoxy, carboxy and amido.

Specific vinyl monomers include the following:

Wherein R is aryl; styrene, α-methylstyrene; halogenated styrenes such as chlorostyrene, α-chlorostyrene, p-iodostyrene, m-flurostyrene, dichlorostyrene and the like; alkyl substituted styrenes such as p-methylstyrene, p-ethylstyrene, o-tert-butylstyrene and the like; alkoxy and aryloxy substituted styrenes such as p-ethoxystyrene, p-propoxystyrene, p-phenoxystyrene and the like;

Wherein R is ketonic; ethyl vinyl ketone, n-propyl vinyl ketone, phenyl vinyl ketone and the like;

Wherein R is heterocyclic; vinyl pyridine, vinyl quinoline, vinyl pyrrole, vinyl carbazole, vinyl thiophene and the like.

Wherein R is nitrile; acrylonitrile and the like;

Wherein R is amido; acrylamide, bicycloheptylacrylamide, diacetoneacrylamide and the like;

Wherein R is carboxy; acrylic acid the the like;

Wherein R is carbalkoxy, methyl acrylate, methyl methacrylate, butyl acrylate, octyl acrylate, lauryl acrylate, cyclohexyl acrylate, phenyl acrylate, benzyl acrylate, diallylphthalate and the like.

The amount of ethylenically unsaturated monomer used can vary over wide limits. For example, the monomer can be used in amounts of about 10 to about 60 percent by weight based on the combined weight of the monomer and the unsaturated polyester. It is preferred to use about 20 to about 50 percent by weight ethylenically unsaturated monomer, based on the combined weight of the monomer and the unsaturated polyester.

Among suitable peroxides that can be used are those which function as free-radical polymerization initiators. Examples of such peroxides are the hydroperoxides such as tert-butyl-hydroperoxide, cumene hydroperoxide, para-menthane-hydroperoxide and the like; peroxy esters such as di-tert-butyl-diperoxyphthalate, tert-butyl perbenzoate and the like; alkyl peroxides such as 2,5-dimethyl-2,5-bis-(t-butylperoxy)hexyne-3, 2,5-dimethyl-2,5-bis-(2-ethylhexanoyl peroxy) hexane and the like; ketone peroxides such as methyl ethyl ketone peroxide, cyclohexanone peroxide and the like; acyl peroxides such as benzoyl peroxide, para-chlorobenzyl peroxide, 2,4-di-chlorobenzoyl peroxide, lauroyl peroxide and the like.

The amount of peroxide used is sufficient to effect a cross-linking or thermosetting of the composition in a relatively short period of time. As a rule, the amount used is about 0.1 to about 5 percent and preferably about 0.5 to about 2 percent by weight based on the weight of the unsaturated polyester.

Fillers which are commonly employed in polyester compositions include, among others, glass fibers, clay, calcium carbonate, silica, hydrated alumina and the like. These materials are generally used in amounts of about 20 to about 300 percent by weight based on the weight of the unsaturated polyester.

The compositions of this invention can be prepared by mixing the components in a suitable apparatus such as a Hobart mixer, at temperatures on the order of about 23° C. to about 50° C.

Once formulated, the compositions can be molded into thermoset articles of desired shape, particularly thermoset articles such as automobile fenders, dash-boards and the like. The actual molding cycle will, of course, depend upon the exact composition being molded. Suitable molding cycles are conducted at temperatures on the order of about 250° F. to about 360° F. for periods of time ranging from about 0.5 minute to about 5 minutes.

The following examples further illustrate the present invention and are not intended to limit the scope thereof in any manner.

Tests noted in the Examples and Controls were conducted as follows:

Surface Smoothness—Determined by measuring surface waviness of a molded panel using a microcorder and reported in micro-inches/inch. The lower the reading, the smoother the surface.

Moisture Absorption—Determined using two test specimens, one inch by three inches, cut from panels which were molded as described in Example 1. The edges of each test specimen were sanded until smooth and the specimens were then preconditioned for 1 hour at a temperature of 100° C. The preconditioned specimens were cooled to room temperature, about 23° C., in a desiccator and weighed. After being weighed, the specimens were immersed in distilled water, which was at room temperature, for 24 hours. At the end of the 24-hour period, the specimens were wiped dry with lint-free paper and reweighed. Moisture or water absorption expressed in terms of percent, was the average gain in weight of the two samples.

Compatibility—Determined by visual observation of a composition made up of 2 parts by weight of the unsaturated polyester solution per 1 part by weight of the low-profile additive solution. This test was conducted by admixing 2 parts by weight of a styrene solution of the unsaturated polyester containing 35 percent by weight styrene per 1 part by weight of a styrene solution of the low-profile additive containing 60 percent by weight styrene, allowing the resultant composition to stand at room temperature and noting the length of time which the composition remained homogeneous.

Also, amounts set forth in the examples and controls are in parts by weight unless otherwise noted.

EXAMPLE 1

The low-profie additive of this Example was a thermoplastic copolymer of vinyl chloride and vinyl acetate having an inherent viscosity of 0.31 and containing 40 percent by weight combined vinyl chloride.

The unsaturated polyester of this example, based on propylene glycol, maleic acid anhydride and phthalic acid anhydride was prepared by condensing a mixture of 9 moles of maleic acid anhydride, 11 moles of propylene glycol and 1 mole of phthalic acid anhydride at a temperature of 200° C. to an acid number of about 35. The polyester was cooled to room temperature and hydroquinone was added thereto in an amount of 0.01 percent by weight, based on the weight of the polyester. Styrene was then admixed with the polyester to obtain a styrene solution containing 35 percent by weight styrene. This solution was then used in carrying out the compatibility, smoothness and water-absorption tests.

Compatibility of the unsaturated polyester—copolymer mixture of styrene solutions—mixture still homogeneous after 90 days.

A composition, based on vinyl chloride-vinyl acetate copolymer and unsaturated polyester, described above, was molded into panels which in turn were subjected to the smoothness and water-absorption tests previously described. The formulation of the composition was as follows:

Unsaturated polyester (used as a styrene solution described above) _____ 33.0
Low-profile additive (used as a styrene solution containing 60 percent by weight styrene) _____ 22.0
Aluminum silicate _____ 45.0
Peroxide _____ 0.5
Mold release agent _____ 0.5
Tert-butyl catechol _____p.p.m.[1]__ 300

[1] p.p.m.=parts per million based on the combined weight of the polyester and low-profile additive solutions.

Portions of this composition were charged into a mold cavity which contained a glass fiber mat and molded therein at a temperature of 300° F. and under a pressure of 500 p.s.i.g. to produce panels 12 inches by 12 inches by ⅛ of an inch thick which contained 30 percent by weight glass fibers.

Smoothness=157
Moisture absorption=1.0 percent

The peroxide noted in all examples and controls was 2,5-dimethyl-2,5-bis(2-ethylhexanoyl peroxy)hexane unless otherwise noted.

The mold release agent noted in the examples and controls was a liquid alkyl phosphate sold under the designation "Zelec" by Dupont.

EXAMPLE 2

Example 1 was repeated wtih the exception that the polyester used was obtained by condensing a mixture containing 11 moles of propylene glycol, 9.5 moles of maleic acid anhydride and 0.5 mole of phthalic acid anhydride. The mixture was condensed at a temperature of 200° C. to an acid number of about 35.

Compatibility of the unsaturated polyester—copolymer mixture of styrene solutions—mixture still homogeneous after 90 days.

Surface Smoothness=117.
Water Absorption=0.92 percent.

EXAMPLE 3

Example 2 was repeated with the exception that 30.25 parts by weight of the polyester solution and 24.75 parts by weight of the low-profile additive solution was used in formulating the composition which was molded into panels.

Compatibility of the unsaturated polyester—copolymer mixture of styrene solutions—still homogeneous after 90 days.

Surface Smoothness=112
Moisture Absorption=0.92 percent

EXAMPLE 4

Example 2 was repeated with, however, the following exceptions:

1. The polyester used was obtained by condensing a mixture containing 4.4 moles of propylene glycol, 3.0 moles of maleic acid anhydride and 1.0 moles of isophthalic acid obtained by free radical initiated polymerization. The mixture was condensed at a temperature of 200° C. to an acid number of about 35.

2. The peroxide used was t-butyl perbenzoate.

Compatibility of the unsaturated polyester—copolymer mixture of styrene solutions—still homogeneous after 90 days.

Surface smoothness=207
Moisture absorption=0.94 percent

CONTROL 1

The copolymer of vinyl chloride and vinyl acetate of this control was the same as that of Example 1.

The unsaturated polyester of this control, based on propylene glycol and maleic acid anhydride, was prepared by condensing a mixture of 1 mole of maleic acid anhydride and 1.1 moles of propylene glycol at a temperature of 200° C. to an acid number of about 35. The polyester was cooled to room temperature and hydroquinone was added thereto in an amount of 0.01 percent by weight, based on the weight of the polyester. Styrene was then admixed with the polyester to obtain a styrene solution containing 35 percent by weight styrene. This solution was then used to carry out the "compatibility," "smoothness" and "water-absorption" tests.

Compatibility of the unsaturated polyester—copolymer mixture—the mixture separated into two phases in one day.

A composition, based on the vinyl chloride-vinyl acetate copolymer and unsaturated polyester was molded into panels which in turn were subjected to the "smoothness" and "water-absorption" tests previously described. The formulation of the composition was as follows:

| | |
|---|---|
| Unsaturated polyester (used as a styrene solution described above) | 36.6 |
| Low-profile additive (used as a styrene solution containing 60 percent by weight styrene) | 21.0 |
| Styrene | 2.4 |
| Aluminum silicate | 40.0 |
| Peroxide | 0.5 |
| Mold release agent | 0.5 |
| Tert-butyl catechol _____p.p.m.__ | 300 |

Portions of this composition were molded into panels in a manner described in Example 1.

Smoothness=157
Water absorption=1.0 percent

CONTROL 2

This control was carried out by repeating Example 1 with the exception that the low-profile additive was poly(vinyl acetate) having an inherent viscosity of 0.36.

Compatibility of the unsaturated polyester—poly(vinyl acetate) mixture of styrene solutions—mixture still homogeneous after 90 days.

Smoothness=158
Moisture absorption=6.13 percent

CONTROL 3

This control was carried out by repeating Example 1 with the exception that the low-profile additive was a thermoplastic copolymer of vinyl chloride and vinyl acetate having an inherent viscosity of 0.28 and containing 20 percent by weight combined vinyl chloride.

Compatibility of the unsaturated polyester—copolymer mixture of styrene solutions—remained homogeneous for 90 days.

Surface smoothness=215
Moisture absorption=2.4 percent

CONTROL 4

This control was carried out by repeating Example 1 with the exception that the low-profile additive was a thermoplastic copolymer of vinyl chloride and vinyl acetate having an inherent viscosity of 0.31 and containing 60 percent by weight combined vinyl chloride.

Compatibility of the unsaturated polyester—copolymer mixture of styrene solution—separated into two phases within 24 hours.

Surface smoothness=183
Moisture absorption=0.81 percent

CONTROL 5

This control was carried out by repeating Example 4 with the following exceptions:

1. The polyester which was used was prepared by condensing a mixture containing 15 moles of maleic acid anhydride, 5 moles of phthalic acid anhydride, 11 moles of propylene glycol, 7.35 moles of ethylene glycol and 3.15 moles of diethylene glycol at a temperature of 200° C. to an acid number of about 35.

2. 28 grams of styrene were used in the formulation of the composition which was molded into panels.

Compatibility of the unsaturated polyester—copolymer mixture of styrene solution—mixture separated into two phases within 24 hours.

Surface smoothness=232
Water absorption=0.86 percent

CONTROL 6

This control was carried out by repeating Example 4 with the following exceptions:

1. The polyester used was produced by condensing a mixture containing 7 moles of maleic acid anhydride, 3 moles of phthalic acid anhydride, 8.8 moles of propylene glycol and 2.2 moles of dipropylene glycol at a temperature of 200° C. to an acid number of about 35.

2. Tert-butyl perbenzoate was used in an amount of 1.0 percent by weight in formulating the composition which was molded into panels.

Compatibility of the unsaturated polyester—copolymer mixture of styrene solutions—mixture still homogeneous after 90 days.

Surface smoothness=257
Water absorption=1.63 percent

What is claimed is:

1. A composition comprising an unsaturated polyester which is the condensation reaction product of a mixture consisting essentially of an unsaturated, dicarboxylic acid or anhydride thereof, an aromatic dicarboxylic acid or anhydride thereof in an amount of about 5 to 30 percent by weight, based on the combined weight of the unsaturated, dicarboxylic acid and the aromatic dicarboxylic acid, and a glycol having the formula:

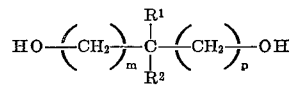

wherein the sum of $m+p$ is at least one and $R^1$ and $R^2$ are hydrogen or alkyl having 1 to 20 carbon atoms; and a thermoplastic copolymer, in an amount of about 10 to about 85 percent by weight based on the weight of said unsaturated polyester, of vinyl chloride and vinyl acetate having a combined vinyl chloride content of about 35 to about 45 percent by weight.

2. A composition as defined in claim 1 wherein an ether diol is present in said mixture in an amount less than about 25 percent by weight of the total diol content of said mixture, said ether diol having the formula:

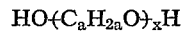

wherein $a$ has a value of at least one and $x$ has a value of at least 2.

3. A composition as defined in claim 1 wherein the copolymer of vinyl chloride and vinyl acetate is present in said composition in an amount of about 20 to about 75 percent by weight based on the weight of the unsaturated polyester.

4. A composition as defined in claim 1 wherein the sum of $m+p$ is 1 to 20 inclusive.

5. A composition as defined in claim 1 wherein the unsaturated polyester is the condensation reaction product of a mixture of propylene glycol, maleic acid anhydride and phthalic acid anhydride.

6. A composition as defined in claim 1 wherein the unsaturated polyester is the condensation reaction product of a mixture containing propylene glycol, maleic acid anhydride and isophthalic acid.

7. A composition as defined in claim 1 containing an ethylenically unsaturated monomer in an amount of about 10 to about 60 percent by weight.

8. A composition as defined in claim 1 wherein the combined vinyl chloride content of the vinyl chloride-vinyl acetate copolymer is about 40 percent by weight.

9. A composition as defined in claim 7 wherein the ethylenically unsaturated monomer is styrene.

10. A composition as defined in claim 1 containing a peroxide.

11. The cured product obtained by free radical initiated polymerization of the composition defined in claim 7.

References Cited

UNITED STATES PATENTS

| | | | |
|---|---|---|---|
| 2,567,719 | 9/1951 | Loritsch et al. | 260—31.8 |
| 2,851,379 | 9/1958 | Staudinger et al. | 117—161 |
| 3,129,110 | 4/1964 | Anderson | 117—37 |
| 3,133,825 | 5/1964 | Rubens | 117—62 |
| 3,700,624 | 10/1972 | Adachi et al. | 260—31.6 |
| 3,701,748 | 10/1972 | Kroekel | 260—40 |
| 3,721,642 | 3/1973 | Schalin et al. | 260—40 |

FOREIGN PATENTS

| | | | |
|---|---|---|---|
| 653,121 | 11/1962 | Canada | 260—862 |
| 1,098,132 | 1/1968 | Great Britain | 260—862 |

WILLIAM H. SHORT, Primary Examiner

E. A. NIELSEN, Assistant Examiner

U.S. Cl. X.R.

260—40 R